United States Patent
Lirosi

(10) Patent No.: US 12,274,258 B2
(45) Date of Patent: Apr. 15, 2025

(54) CONVERTIBLE CLIMBING STICK/PLATFORM

(71) Applicant: Jarrett Dominick Lirosi, Jackson, NJ (US)

(72) Inventor: Jarrett Dominick Lirosi, Jackson, NJ (US)

(*) Notice: Subject to any disclaimer, the term of this patent is extended or adjusted under 35 U.S.C. 154(b) by 993 days.

(21) Appl. No.: 17/333,082

(22) Filed: May 28, 2021

(65) Prior Publication Data

US 2022/0378038 A1    Dec. 1, 2022

(51) Int. Cl.
*A01M 31/02* (2006.01)
*E06C 1/38* (2006.01)
*E06C 1/39* (2006.01)

(52) U.S. Cl.
CPC ............ *A01M 31/02* (2013.01); *E06C 1/381* (2013.01); *E06C 1/39* (2013.01)

(58) Field of Classification Search
CPC ........... A01M 31/02; E06C 1/381; E06C 1/39
USPC .................................................... 182/27, 115
See application file for complete search history.

(56) References Cited

U.S. PATENT DOCUMENTS

| | | | |
|---|---|---|---|
| 4,782,918 A | 11/1988 | Brunner et al. | |
| 5,538,101 A | 7/1996 | Kempf | |
| 5,899,295 A * | 5/1999 | Arena | A01M 31/02 182/188 |
| 6,334,508 B1 | 1/2002 | Shields | |
| 6,467,577 B1 * | 10/2002 | Charlebois, Jr. | E06C 7/14 248/210 |
| 7,156,206 B2 | 1/2007 | Prejean | |
| 7,434,662 B2 * | 10/2008 | McFall | A01M 31/02 182/187 |
| 8,272,479 B1 | 9/2012 | Leach | |
| 8,631,904 B1 * | 1/2014 | Wilds | A01M 31/02 182/120 |
| 8,991,555 B2 * | 3/2015 | Furseth | E06C 7/48 182/187 |
| 8,997,933 B2 | 4/2015 | Furseth et al. | |
| 9,516,874 B2 | 12/2016 | Richey et al. | |
| 10,306,985 B1 * | 6/2019 | Burdeaux | A47B 96/027 |
| 10,524,577 B2 | 1/2020 | Christie | |
| 10,767,417 B2 * | 9/2020 | Andrade | A47B 5/04 |
| 10,849,321 B2 * | 12/2020 | Peel | E04H 3/28 |
| 10,939,676 B1 * | 3/2021 | Harter | E04G 5/10 |
| 11,198,038 B1 * | 12/2021 | Power, II | E06C 1/38 |
| 2003/0209388 A1 | 11/2003 | Arsenault et al. | |

(Continued)

OTHER PUBLICATIONS

Pilaar, E. J., & Gad Imam, H. O. (2017). "Tree Stand Redesign", Worcester Polytechnic Institute Retrieved from https://digitalcommons.wpi.edu/mqp-all/1413 Retrieved on: Apr. 9, 2021 (82 pages total).

(Continued)

*Primary Examiner* — Janet M Wilkens
*Assistant Examiner* — Susan M. Heschel
(74) *Attorney, Agent, or Firm* — Charney IP Law LLC

(57) ABSTRACT

A mobile apparatus that is configurable as a climbing stick and a perch or platform without a tool includes a post, an upper step and an upper tree brace extending from a first end of the post, and a lower step and a lower tree brace extending from a second end of the post, and that further includes an extension configured to convert the upper step to a perch or platform without a tool.

20 Claims, 22 Drawing Sheets

(56) References Cited

U.S. PATENT DOCUMENTS

| | | | | |
|---|---|---|---|---|
| 2012/0125715 A1* | 5/2012 | Furseth | .................. | E06C 7/081 |
| | | | | 72/253.1 |
| 2014/0138185 A1 | 5/2014 | Samona | | |
| 2015/0153127 A1* | 6/2015 | Noel | ...................... | F41A 23/18 |
| | | | | 42/94 |
| 2018/0073298 A1* | 3/2018 | Hand | ...................... | E06C 1/381 |
| 2020/0404901 A1 | 12/2020 | Power, II et al. | | |

OTHER PUBLICATIONS

Lone Wolf Portable Tree Stands, "Climbing Stands" Retrieved from: https://lonewolfhuntingproducts.com/collections/factory-blemished-products/blem Retrieved on: Apr. 9, 2021 (1 page total).

Alco Aluminium Products, "Tree Climbing Ladder" Retrieved from: https://www.tradeindia.com/fp872407/Tree-Climbing-Ladder.html Retrieved on: Apr. 9, 2021 (3 pages total).

King, Kyle, "Tree-Facing Treestand", A Baccalaureate thesis submitted to the School of Dynamic Systems College of Engineering and Applied Science University of Cincinnati (Apr. 2015) (54 pages total).

Out on a Limb MFG, "SH1KAR One-Stick" Retrieved from: https://outonalimbmfg.com/sh1kar/ Retrieved on: May 15, 2021 (6 pages total).

Out on a Limb MFG, "The Scout" Retrieved from: https://outonalimbmfg.com/the-scout/ Retrieved on: May 14, 2021 (16 pages total).

Eastern Woods Outdoors, "Ultimate One Stick", Retrieved from: https://doublesteps.com/product/ultimate-one-stick/ Retrieved on: May 14, 2021 (11 pages total).

\* cited by examiner

View A – With Extension 112 in an Uninstalled Position

View A – With Extension 112 in an Installed Position

View B – With Extension 112 in the Installed Position

View C

View C – With Extension 112 in the Installed Position

View D

View C – With Extension 112 in the Installed Position

CONVERTIBLE CLIMBING STICK/PLATFORM

BACKGROUND

Hunters use tree stands to obtain better vantage points from which to hunt.

Conventional mobile tree stands include a seat and a platform beneath the seat, secured by cables or braces.

There are a several drawbacks to conventional tree stands. Once seated in a conventional tree stand, a hunter does not have a 360-degree view. Conventional mobile tree stands are also cumbersome to carry, assemble, and disassemble, require tools, and require a separate climbing apparatus to ascend a tree.

In some situations, a hunter may prefer a seatless mobile tree platform or perch that is easy to carry, and easy and quick to set-up, without tool, and without needing a separate climbing device.

BRIEF DESCRIPTION OF THE DRAWINGS/FIGURES

Figure 1:
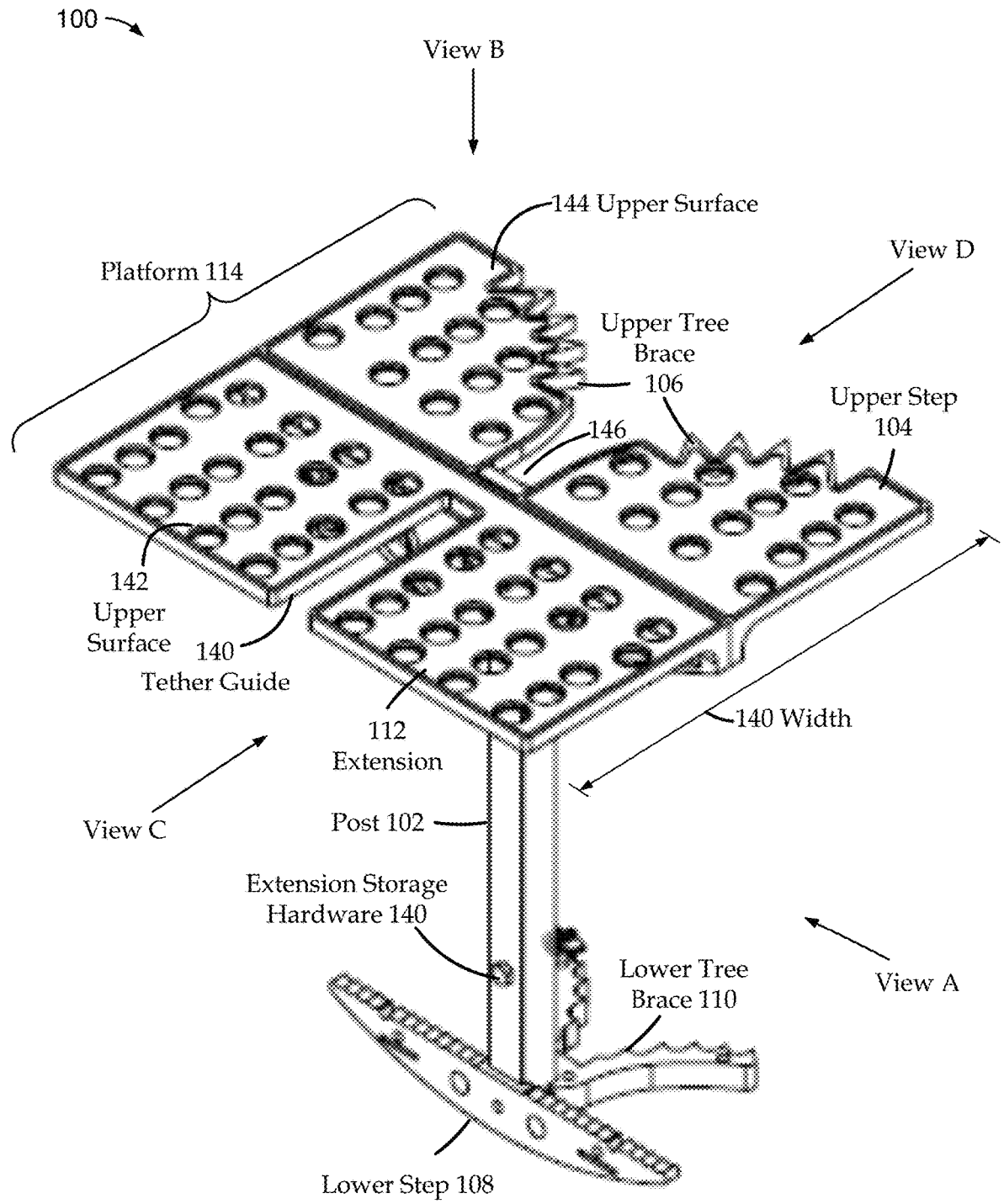
FIG. 1 is a perspective view of an example mobile apparatus that is convertible between a climbing stick and a platform, without use of a tool.

In the drawings, the leftmost digit(s) of a reference number identifies the drawing in which the reference number first appears.

DETAILED DESCRIPTION

Disclosed herein is a mobile apparatus that is convertible between a climbing stick and a platform or perch, without use of a tool. Also disclosed herein are techniques/methods of using such an apparatus.

An advantage of a mobile apparatus as disclosed herein is that a climber does not need to purchase and carry a tree platform and a separate climbing stick(s), or tools. Additional advantages will become apparent throughout the following disclosure.

FIG. 1 is a perspective view of an example mobile apparatus 100 that is convertible between a climbing stick and a platform, without use of a tool.

Mobile apparatus 100 includes a post 102. Mobile apparatus 100 further includes an upper step 104 and an upper tree brace 106 extending from a first end of post 102. Mobile apparatus 100 further includes a lower step 108 and a lower tree brace 110 extending from a second end of post 102.

Mobile apparatus 100 further includes an extension 112 to convert upper step 104 to a perch or platform 114, without use of a tool. Example techniques to install and uninstall extension 112, without use of a tool, are provided further below.

When extension 112 is in an uninstalled position, apparatus 100 may be useful as a climbing stick to permit a user to climb a tree. When extension 112 is in the installed position, as illustrated in FIG. 1, platform 114 may be useful to permit a user to stand at an elevated position of a tree, such as for hunting, observing, a photography, electric utility line work, military purposes, and/or other activities.

In the example of FIG. 1, a surface area of platform 114 is a sum of a surface area of extension 112 and a surface area of upper step 104.

A width 140 of platform 114 may be within a range of 6-20 inches, 8-18 inches, 10-16 inches, or 12-14 inches. In an embodiment, width 140 is approximately 14 inches.

Further in the example of FIG. 1, an upper surface 142 of extension 112 and an upper surface 144 of upper step 104 are in a same plane when extension 112 is in the installed position.

In the example of FIG. 1, an edge of upper step 104 is configured as upper tree brace 106. Alternatively, an upper tree brace may be a separate element, such as illustrated with respect to lower tree brace 110.

Mobile apparatus 100 may further include a handle configured to retractably extend through an opening 146 of upper step 104.

Figure 2:
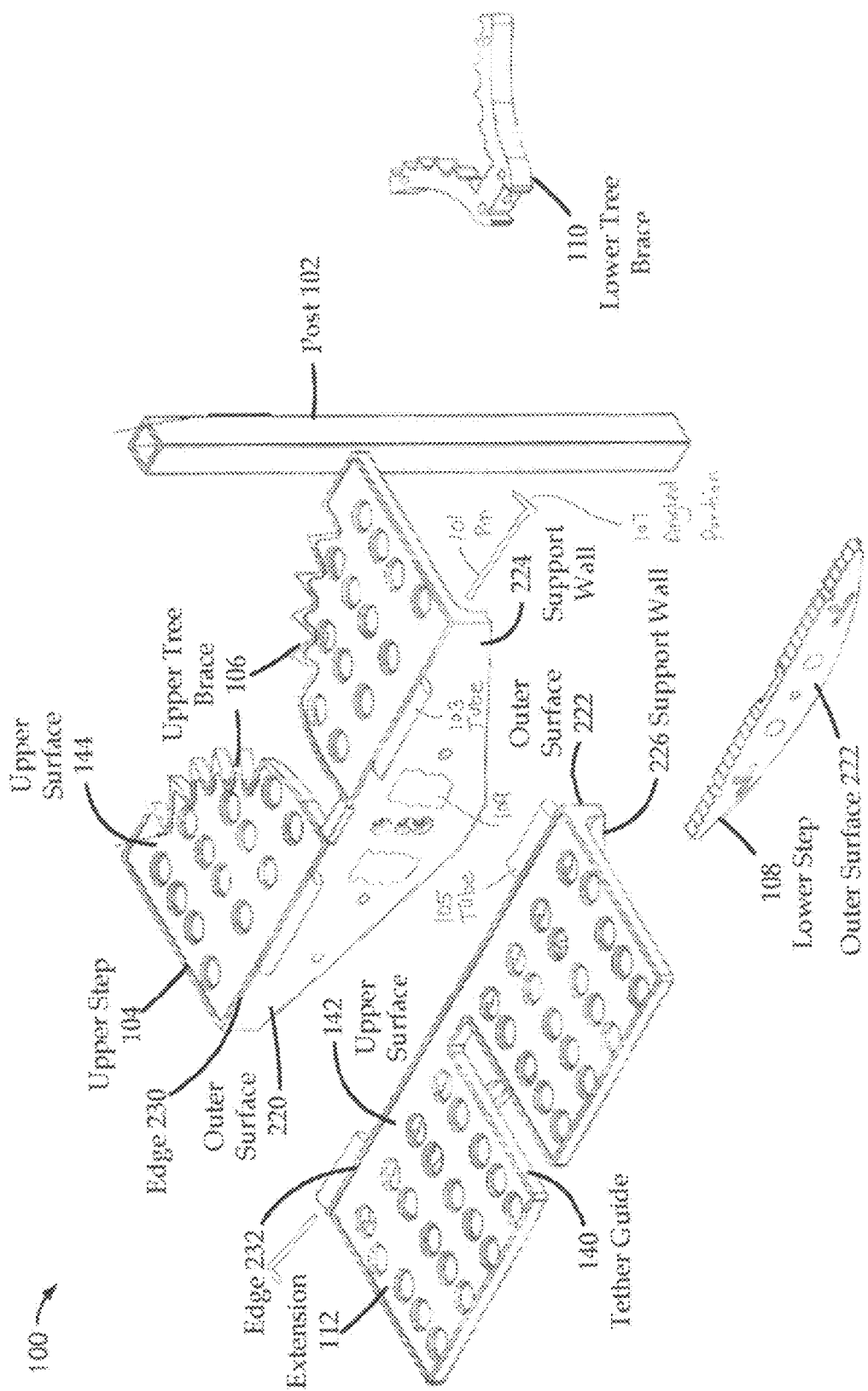
FIG. 2 is a perspective view of components of the mobile apparatus.

FIG. 2 is a perspective view of components of mobile apparatus 100. One or more components of apparatus 100 may be manufactured from metal/metal alloy, plastic, a composite material, and/or other material(s). Components of apparatus 100 may be connected to one another via glue, screws, bolts and nuts, and/or welding. Alternatively, or additionally, components of apparatus 100, or a subset thereof, may be manufactured as an integral unit. Apparatus 100 is not, however, limited to the foregoing examples.

In the example of FIG. 2, upper step 104 includes a first support wall 224 extending perpendicularly downward from an edge of upper step 104. Further in the example of FIG. 2, extension 112 includes a second support wall 226 extending perpendicularly downward from an edge of extension 112. In this example, first and second support walls 224 and 226 are configured to contact one another when extension 112 is in the installed position.

Mobile apparatus 100 may further include a layer of a sound-suppressing material 109 between first and second support walls 224 and 226. This may be useful to limit noises that might otherwise be generated when extension 112 comes into physical contact with upper step 104. The layer of a sound-suppressing material 109 may be adhered to an outer surface 220 of support wall 224 and/or to an outer surface 222 of support wall 226. The layer of a sound-suppressing material 109 may include, without limitation, felt or rubber.

Figure 3:
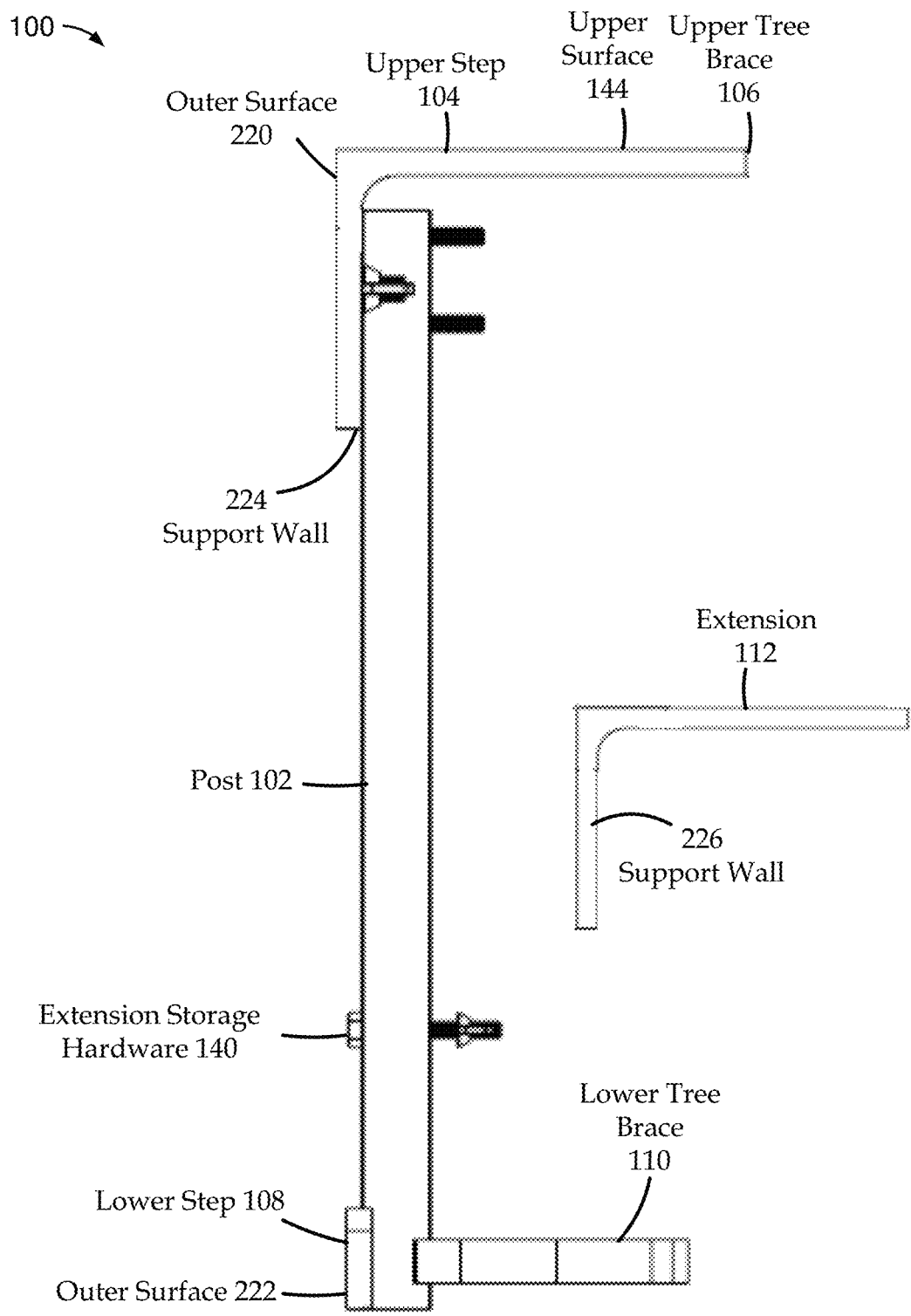
FIG. 3 is a side-view of the mobile apparatus configured as a climbing stick.

FIG. 3 is a side-view of apparatus 100, (view A in FIG. 1), in which extension 112 is in an uninstalled position. In this example, apparatus 100 is configured as a climbing stick.

Figure 4:
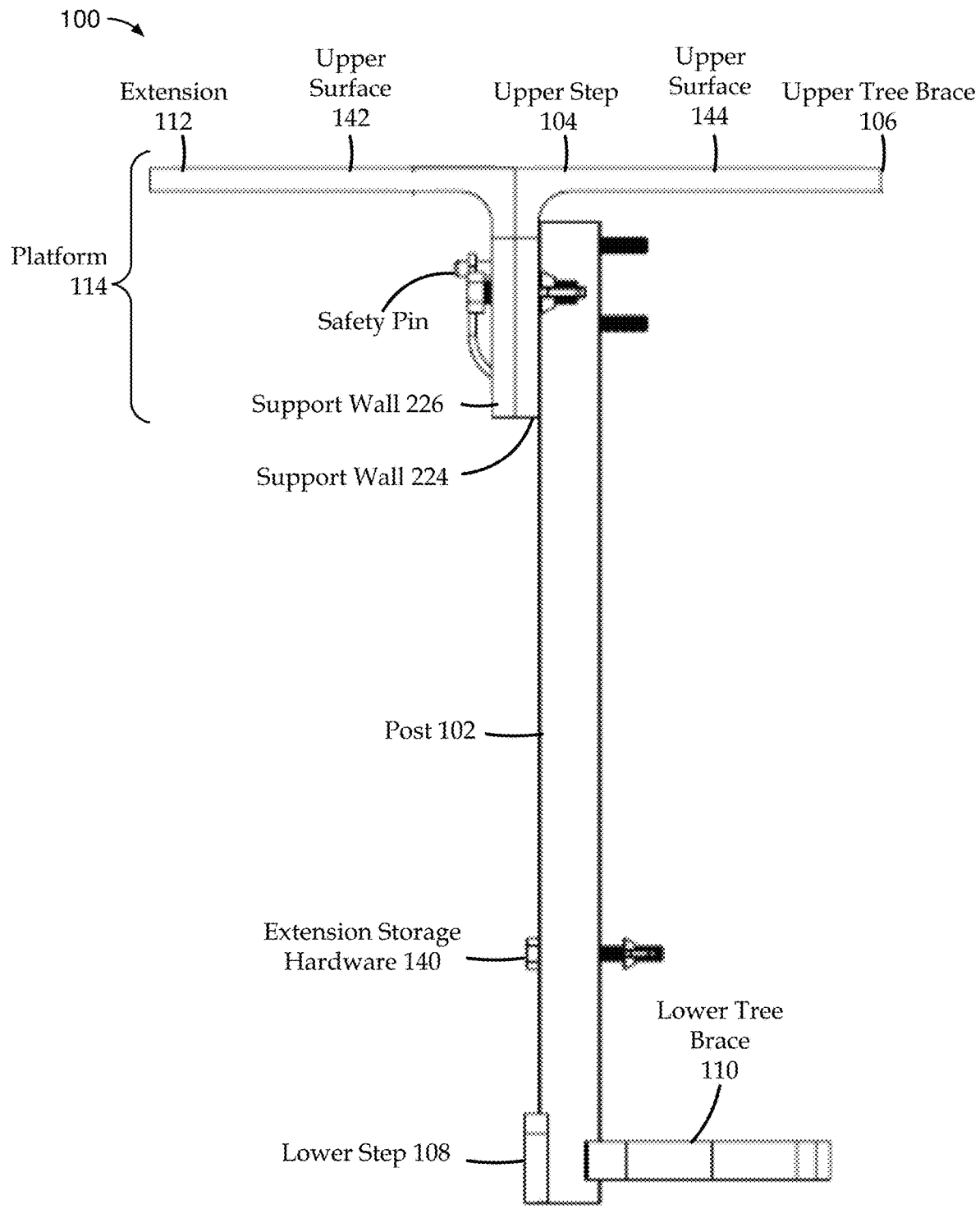
FIG. 4 is a side-view of the mobile apparatus configured as a perch or platform.

FIG. 4 is a side-view of apparatus 100, (view A in FIG. 1), in which extension 112 is in an installed position. In this example, upper step 104 and extension 112 form platform 114.

In the examples of FIGS. 1 and 4, post 102 extends from a central portion of a lower surface of platform 14 when extension 12 is in the installed position. This may be useful to optimally support the weight of a climber.

Figure 5:
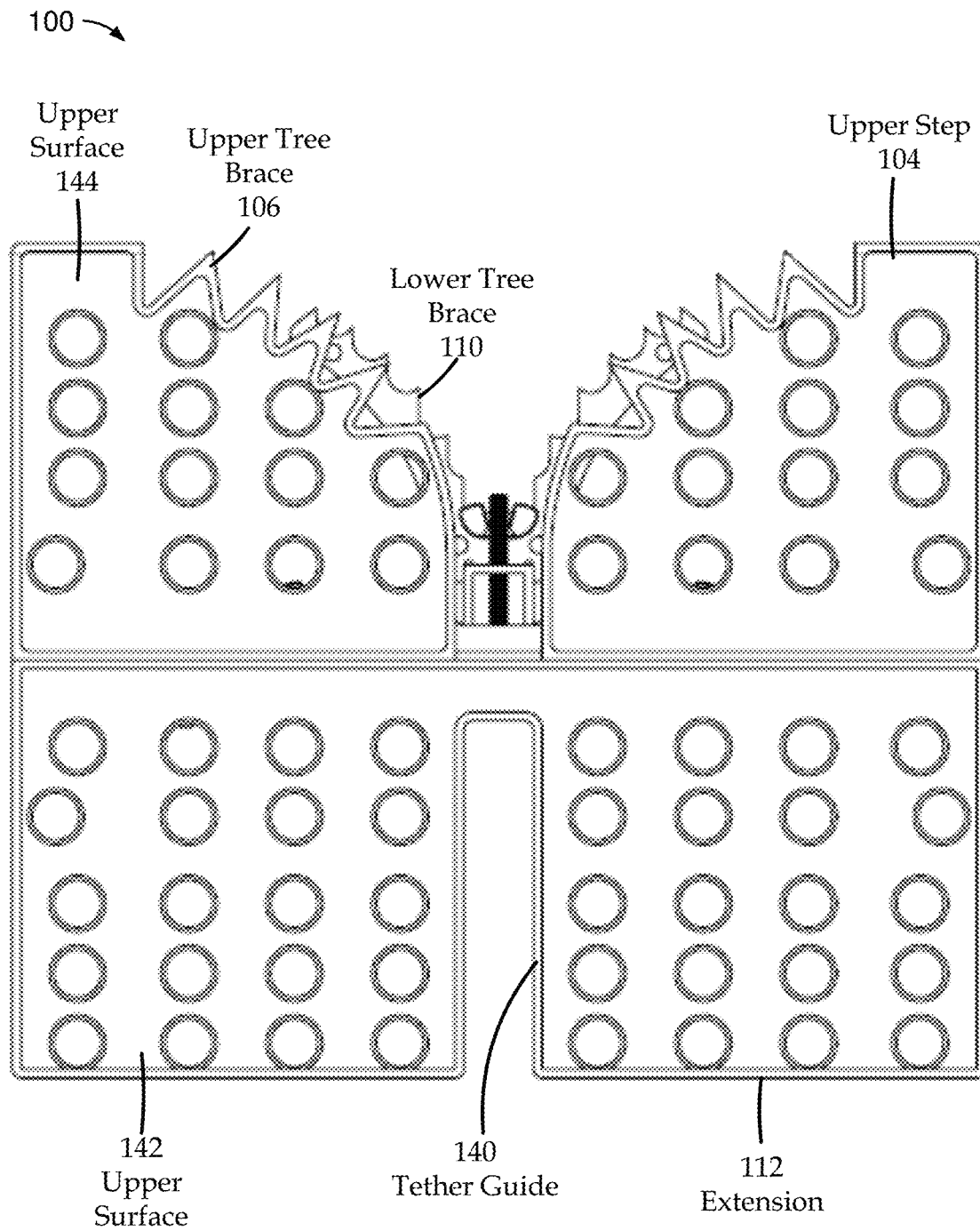
FIG. 5 is a top view of the mobile apparatus configured as a perch or platform.

FIG. 5 is a top view of apparatus 100, (view B in FIG. 1), in which extension 112 is in the installed position.

In the examples of FIGS. 1, 2, and 5, upper tree brace 106 and lower tree brace 110 each include a convex V-shaped serrated edge. This may be useful to securely brace mobile apparatus 100 against a tree for which a diameter is within a relatively wide range of diameters. This may also be useful to maintain post 102 parallel with the tree, and to maintain post 112 a distance from the tree, which may vary relatively slightly depending upon the diameter of the tree.

Figure 6:
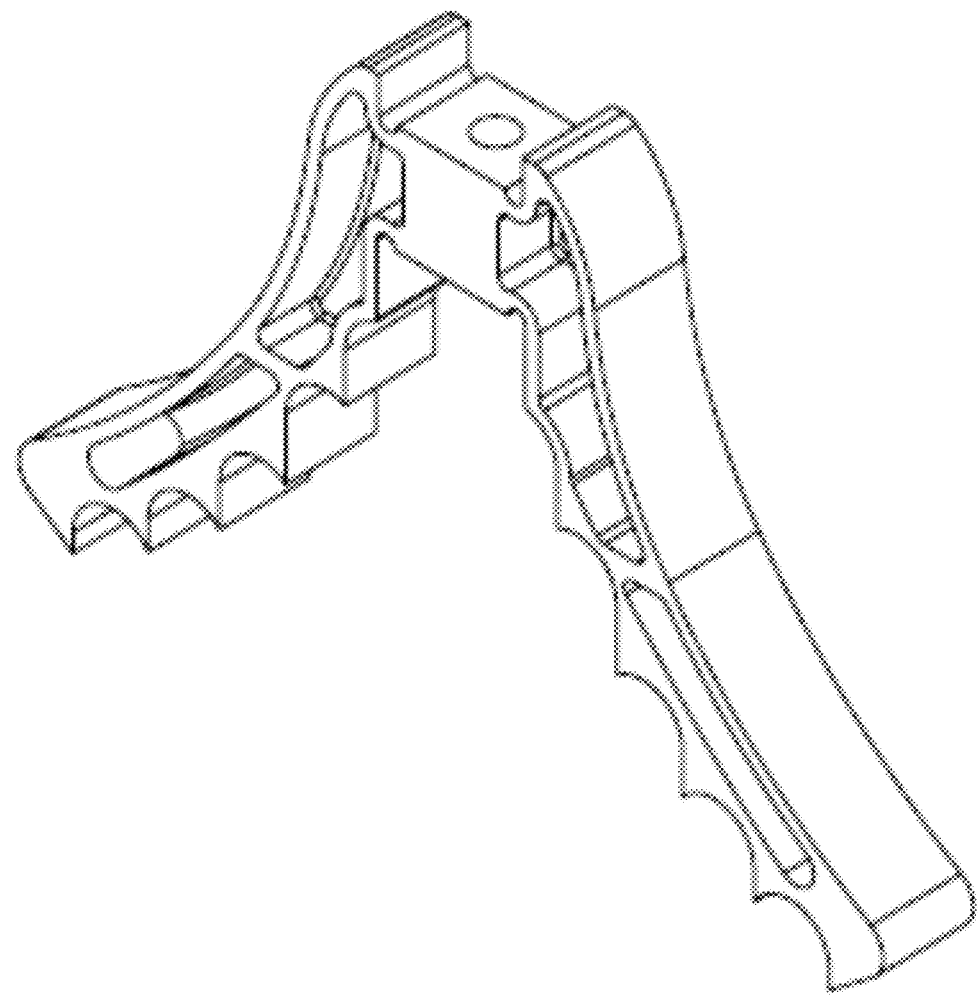
FIG. 6 is a perspective view of a lower tree brace of the mobile apparatus.

FIG. 6 is a perspective view of lower tree brace 110.

Figure 7:
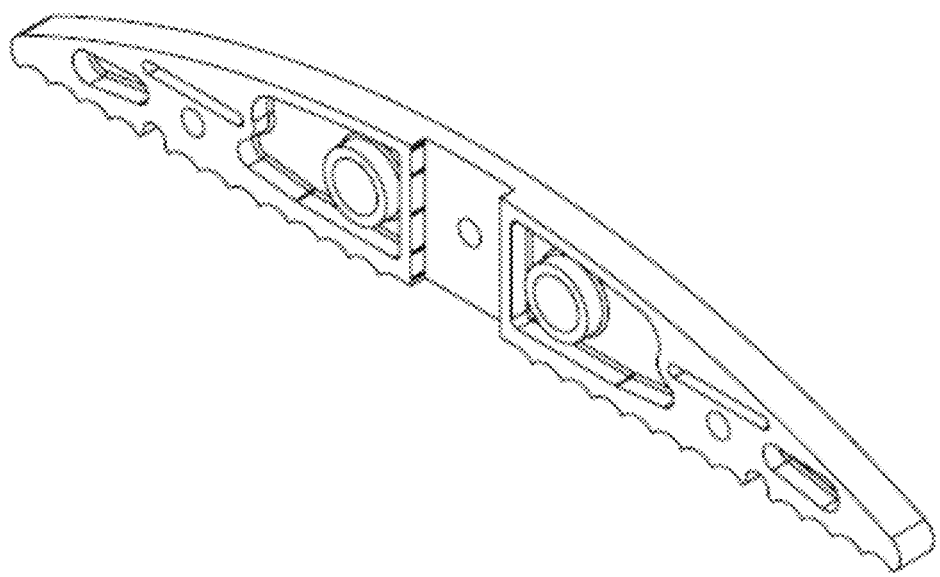
FIG. 7 is a perspective view of a lower step of the mobile apparatus.

FIG. 7 is a perspective view of lower step 108, directed toward an underside of lower step 108.

Example techniques to place and/or hold extension 112 in an installed position are provided below. A mobile apparatus as disclosed herein is not, however, limited to the following examples.

In an embodiment, first support wall 224 or second support wall 226 includes flanged protrusions extending therefrom, and the other support wall has elongated openings through which to receive and secure the flanged protrusions to maintain the first and second support walls in contact with one another. An example is provided below with reference to FIGS. 8, 9, and 10.

Figure 8:
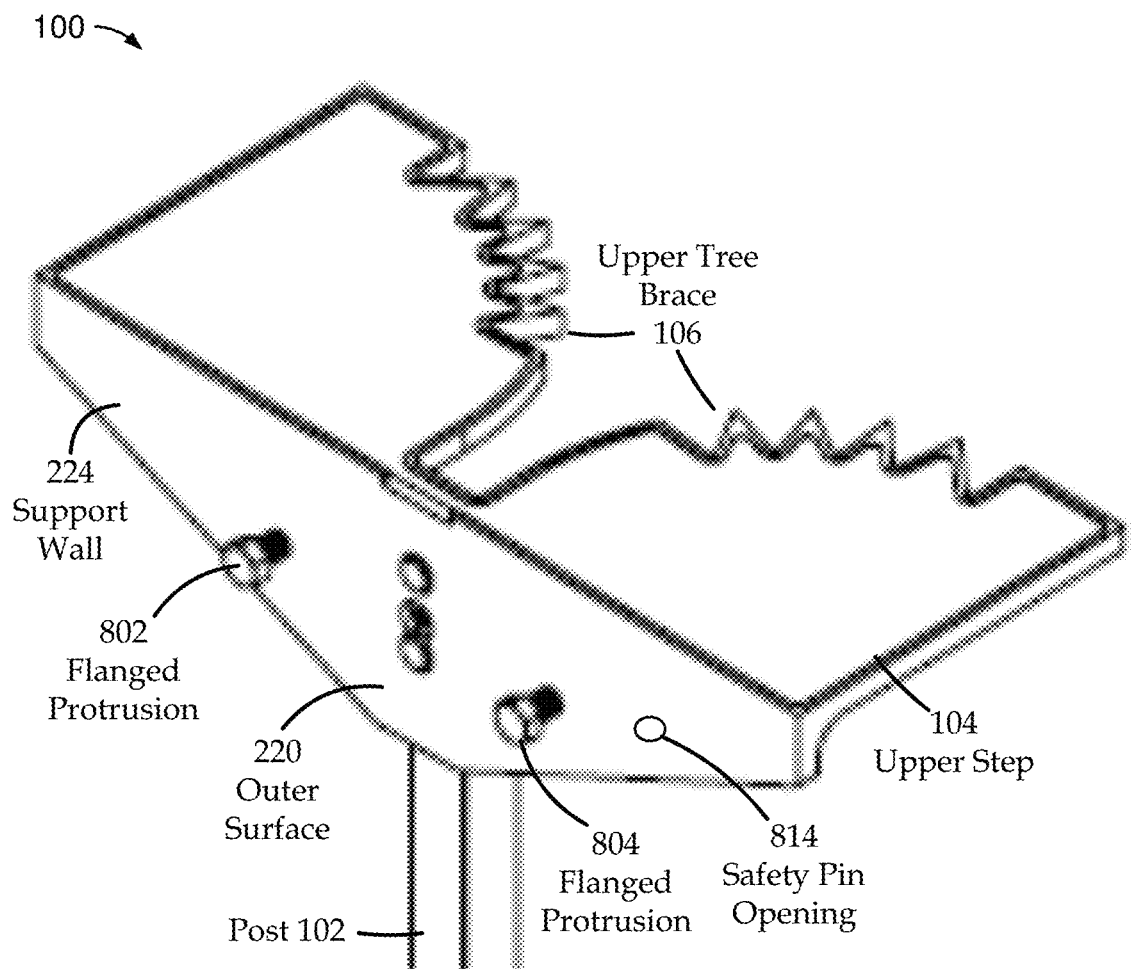
FIG. 8 is an illustration of the mobile apparatus in which a support wall of an upper step of the mobile apparatus includes flanged protrusions extending from an outer surface.
Figure 9:
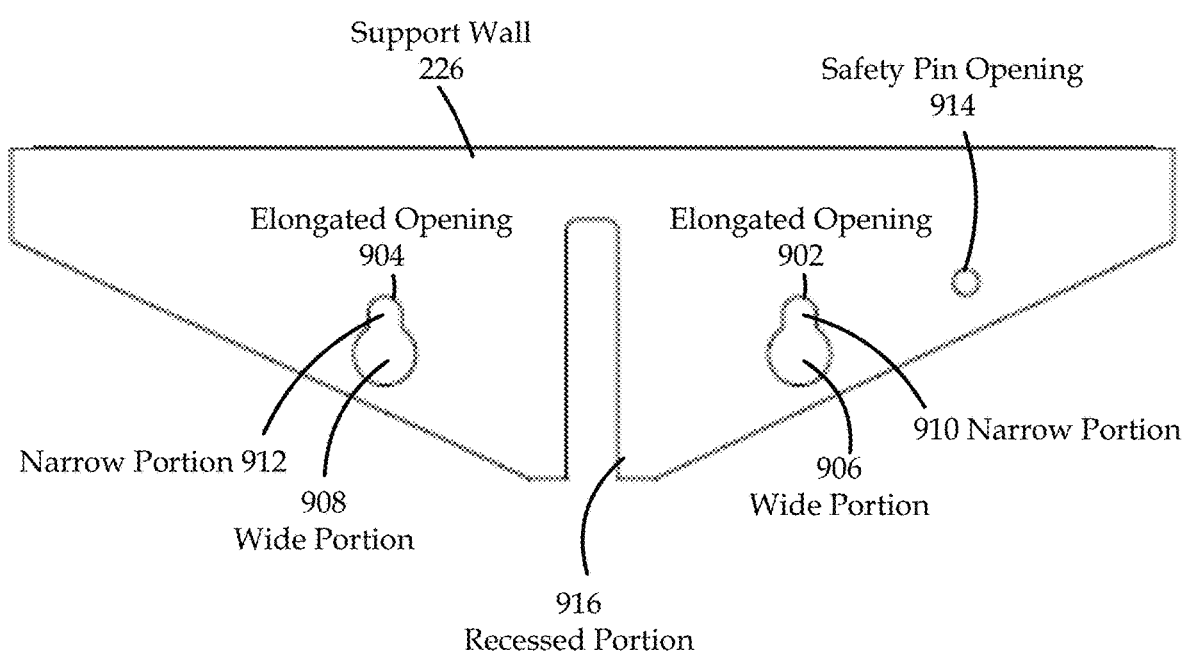
FIG. 9 is an illustration of a support wall of an extension of the mobile apparatus having openings to receive the flanged protrusions.

FIG. 8 is a perspective view of a portion of mobile apparatus 100 in which support wall 224 includes flanged protrusions 802 and 804 extending from outer surface 220. FIG. 9 is an illustration of support wall 226 of extension 112, with corresponding elongated openings 902 and 904 therethrough.

Elongated openings 902 and 904 and flanged ends of protrusions 802 and 804 are dimensioned such that the flanged ends of protrusions 802 and 804 fit through wide portions 906 and 908 of elongated openings 902 and 904, but not narrow portions 910 and 912. When support wall 226 is placed against support wall 224, the flanged ends of protrusions 802 and 804 pass though wide portions 906 and 908 of elongated openings 902 and 904. When extension 112 is then lowered relative to upper step 104, narrow portions 910 and 912 of elongated openings 902 and 904 retain the flanged ends of protrusions 802 and 804.

In the example of FIG. 9, support wall 226 has a recessed portion 916, which may expose bolts that connect upper step 104 to post 102.

Figure 10:
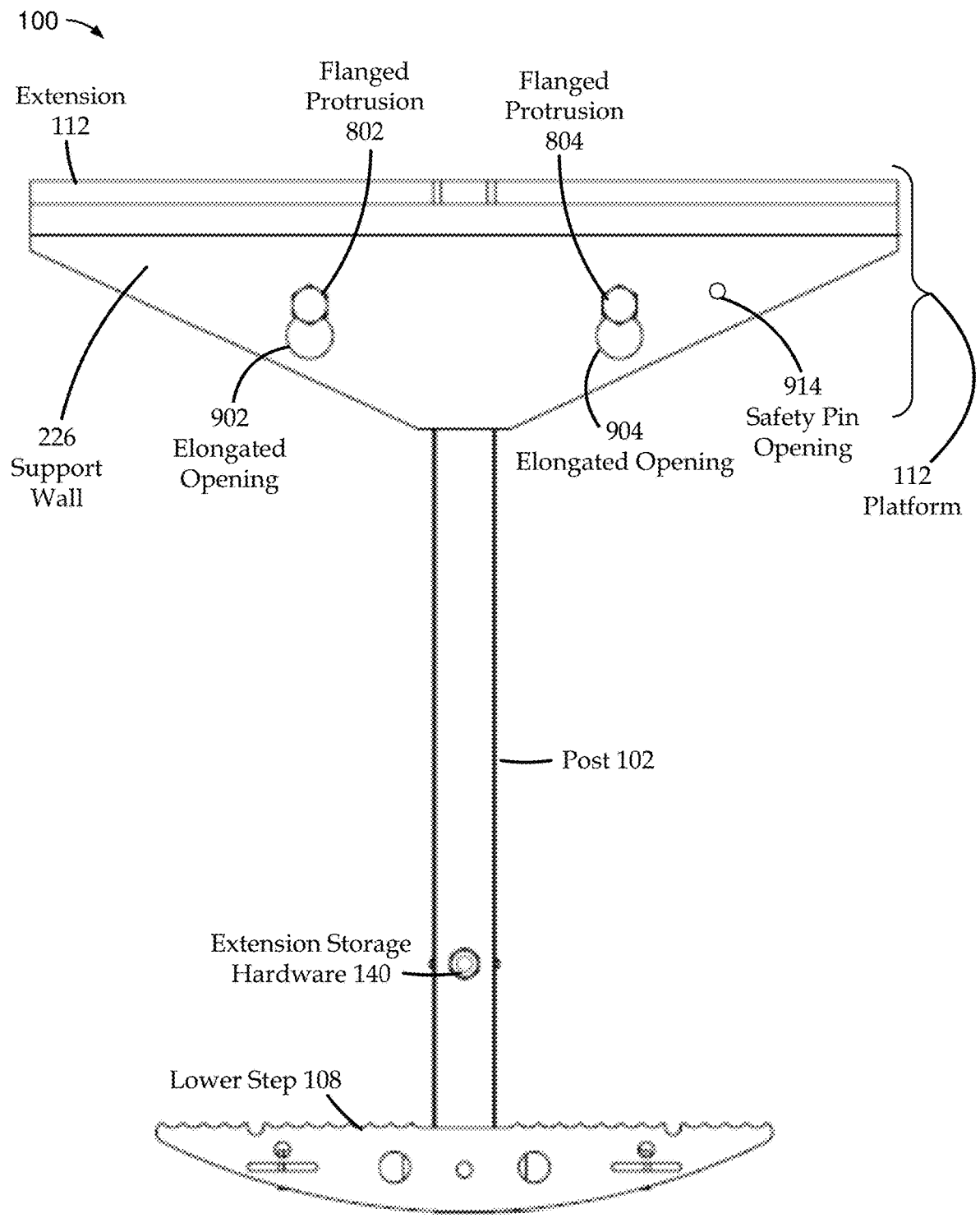
FIG. 10 is an illustration of the mobile apparatus in which the extension is mounted to the upper step with the flanged protrusions.

FIG. 10 is an illustration of mobile apparatus (View C of FIG. 1) configured as described above with reference to FIGS. 8 and 9.

In an embodiment, support wall 224 (FIG. 8) has a safety pin opening 814, and support wall 226 (FIG. 9) has a corresponding safety pin opening 914. When extension 112 is lowered relative to upper step 104 so that narrow portions 910 and 912 of elongated openings 902 and 904 retain the flanged ends of protrusions 802 and 804, safety pin openings 814 and 914 are aligned with one another. A removeable safety pin may then be inserted through safety pin openings 814 and 914 to preclude movement of protrusions 802 and 804 within elongated openings 902 and 904. This precludes movement of the first and second support walls relative to one another, which precludes extension 112 from inadvertently or accidentally being dislodged or disconnected from upper step 104.

Figure 11:
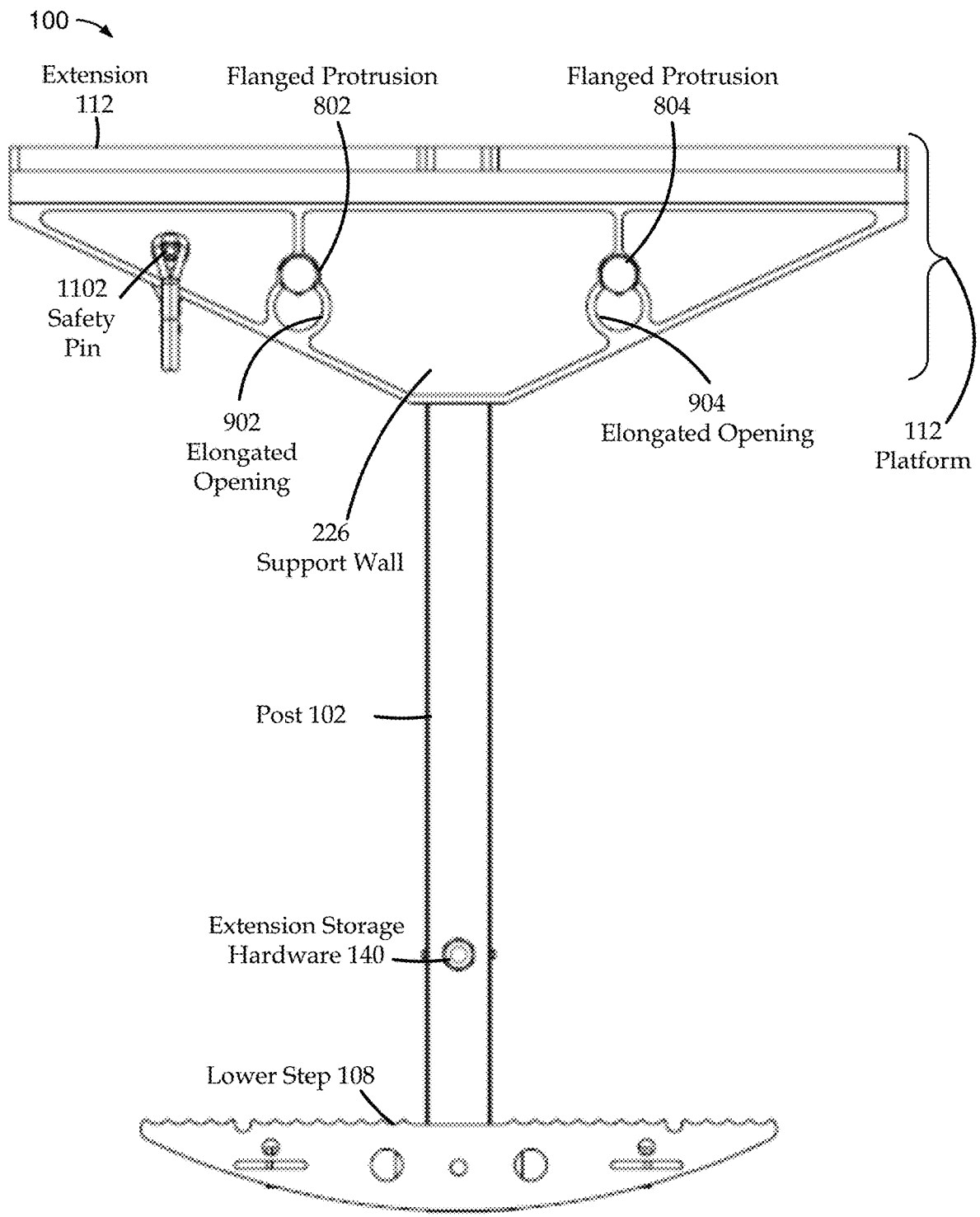
FIG. 11 is an illustration of mobile apparatus in which the extension is mounted to the upper step with the flanged protrusions, and further including a removable safety pin.

FIG. 11 is an illustration of mobile apparatus 100 (View C of FIG. 1) configured as described above with reference to FIGS. 8 and 9, and further including a removable safety pin 1102.

In an embodiment, protrusions 802 and 804 may be configurable such that, when extension 112 is not in the installed position, only the flanged ends of protrusions 802 and 804 extend from support wall 224. This may help to prevent a user from getting snagged by extensions 802 and 804 when apparatus 100 is used as a climbing stick.

Figure 12:
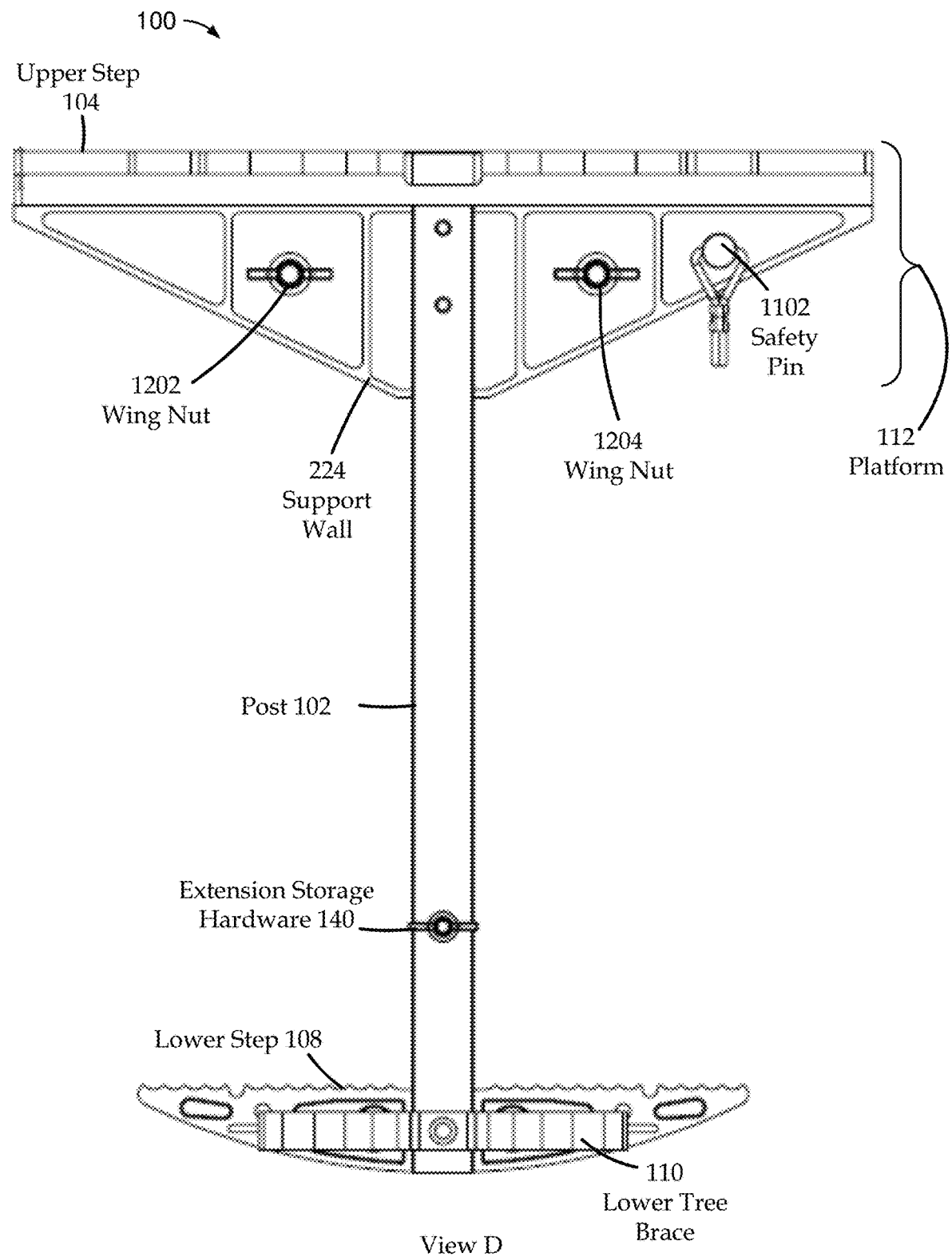
FIG. 12 is an illustration of the mobile apparatus, further including wing nuts to retain the flanged protrusions.

As an example, each of protrusions 802 and 804 may include a threaded bolt having bolt heads that serve as flanged ends of protrusions 802 and 804. Each of protrusions 802 and 804 may further include a nut (e.g., a wing nut) to retain the respective bolt within support wall 224. FIG. 12 is an illustration of mobile apparatus 100, from the perspective of View D in FIG. 1, further including wing nuts 1202 and 1204. Support wall 224 may include threaded or unthreaded openings through which to insert protrusions 802 and 804.

In the foregoing examples, protrusions 802 and 804 extend from support wall 224 of upper step 104. Alternatively, or additionally, protrusions may extend from support wall 226 of extension 112, and support wall 224 may include corresponding elongated openings.

In another embodiment, extension 112 may be removably attachable to upper step 104 with a pin (rod) 101. This is described below with reference to FIG. 2. In FIG. 2, one or more tubes 103 may be provided along portions of an edge 230 of upper step 104, and one or more other tubes 105 may be provided along complimentary portions of an edge 232 of extension 112. A pin 101 may be inserted through the tubes along a length of edges 230 and 232 to secure extension 112 to upper step 104. The pin 101 may include an angled portion 107 extending from an end of the pin to permit a user to pull and remove the pin to uninstall extension 112. While the pin 101 is inserted, the tubes and the pin may have an appearance similar a hinge.

When extension 112 is not in an installed position, extension 112 may mounted in a way to permit apparatus 102 to carried as a backpack. Examples are provided below with reference to FIGS. 13-16.

Figure 13:
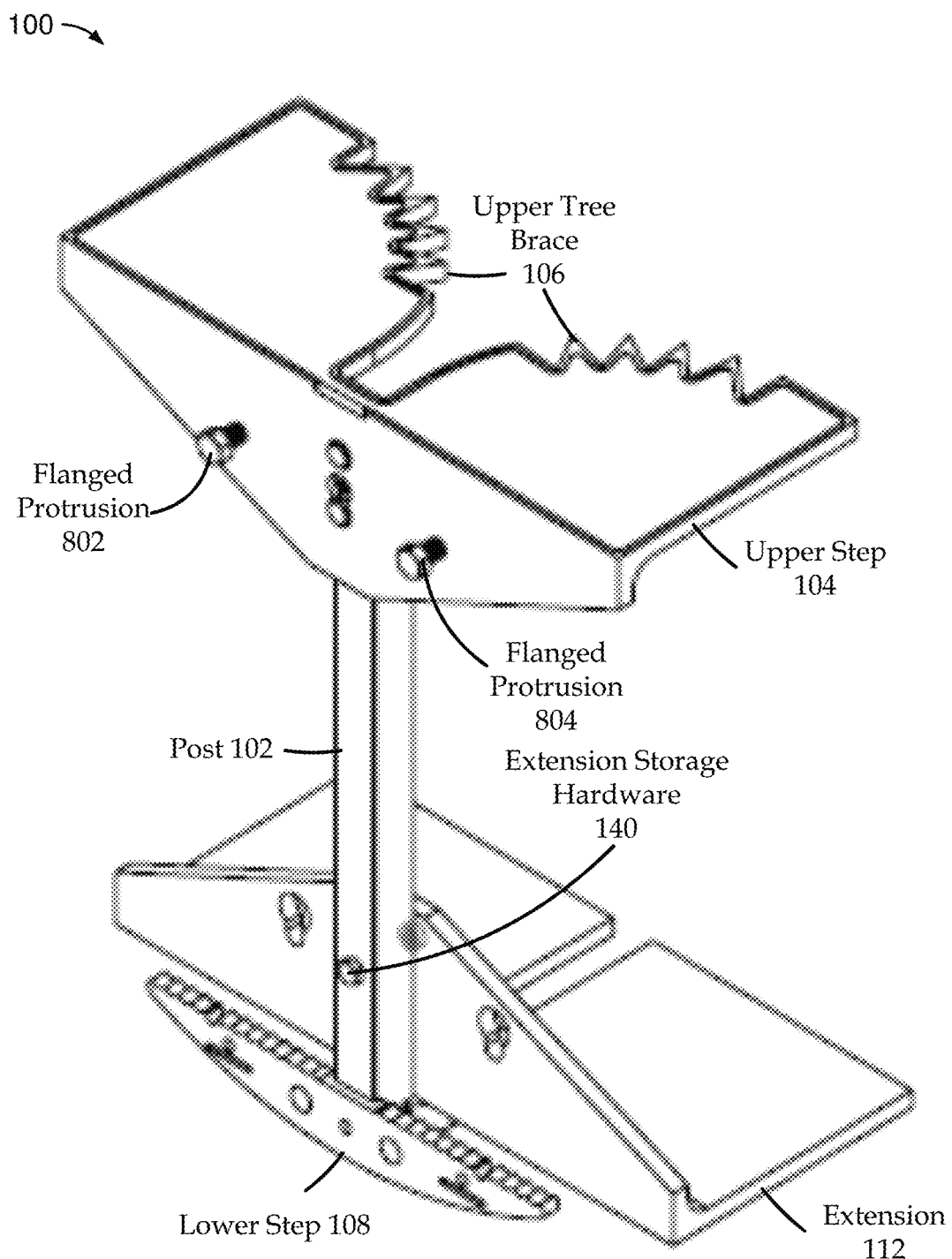
FIG. 13 is a perspective view of the mobile apparatus, in which an extension is removably mounted to a post when not in use, without use of a tool.

FIG. 13 is a perspective view of mobile apparatus 100, in which extension 112 is removably mounted to post 102 when not in use, without use of a tool. Mobile apparatus 100 may include extension storage hardware 140, which may include a threaded protrusion (e.g., a bolt) extending from post 102 and a thumb screw and/or wing nut. In this example, when a user is ready to use mobile device 100 as a climbing stick, extension 112 may be removed from post 102, without use of a tool, and hung from a harness of the user while the user climbs a tree.

Figure 14:
FIG. 14 is an image of a mobile apparatus that is configurable as a climbing stick and a platform without use of a tool, configured as illustrated in FIG. 13, carried as a backpack.

FIG. 14 is an image of a mobile apparatus 1400, configured as illustrated in FIG. 13, carried as a backpack.

Figure 15:
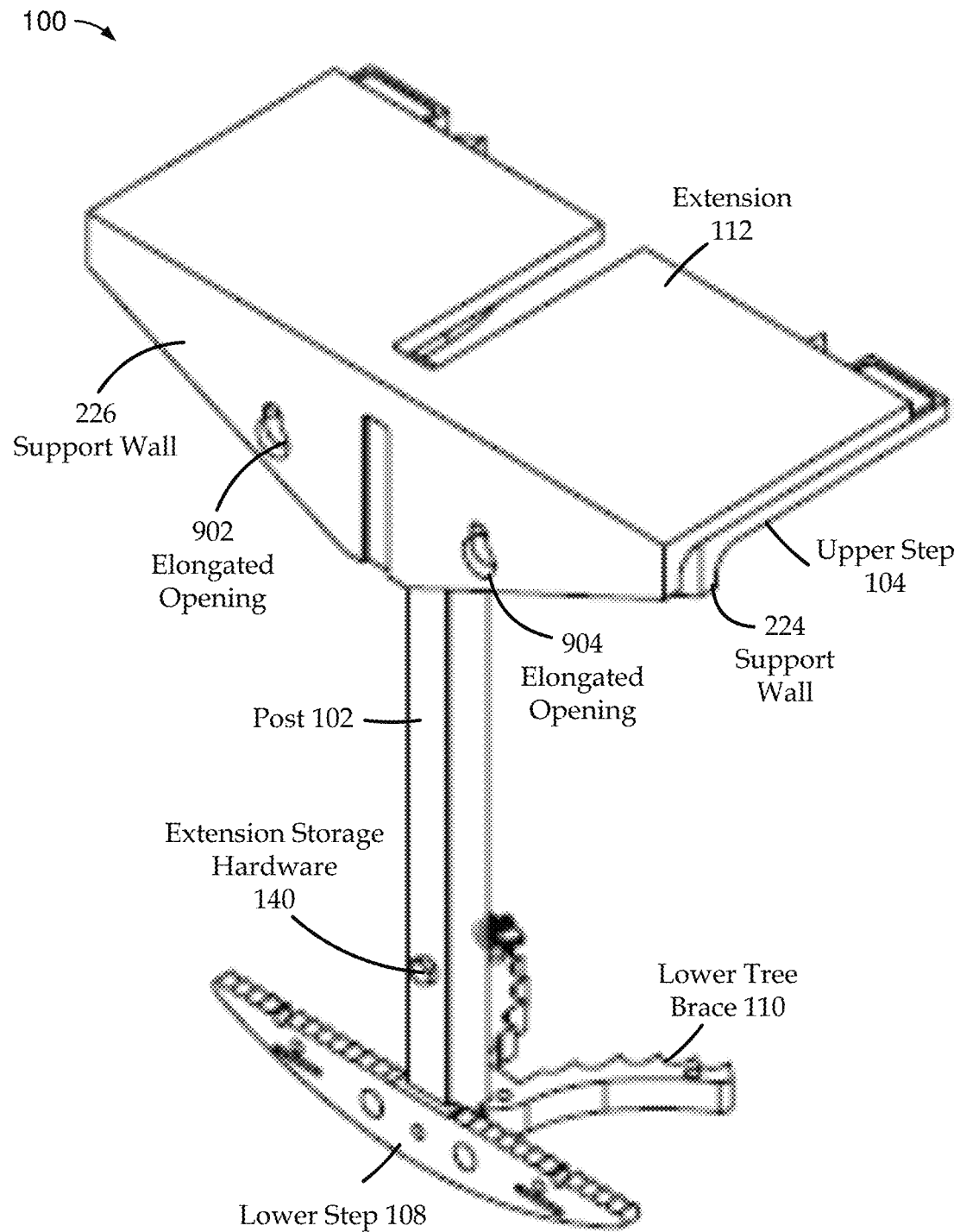
FIG. 15 is a perspective view of the mobile apparatus if FIG. 1, in which the extension is removably mounted to the upper step when not in use.

FIG. 15 is a perspective view of mobile apparatus 100, in which extension 112 is removably mounted to upper step 104 when not in use. In this example, elongated openings 902 and 904 may be aligned with flanged protrusions 802 and 804 and a safety pin may be inserted through aligned openings in support walls 224 and 226 to secure extension 112 in the position illustrated in FIG. 15. In this embodiment, extension storage hardware 140 may be omitted.

Figure 16:
FIG. 16 is an image of another mobile apparatus that is configurable as a climbing stick and a platform without use of a tool, configured as illustrated in FIG. 15, carried as a backpack.

FIG. 16 is an image of a mobile apparatus 1600, configured as illustrated in FIG. 15, carried as a backpack.

In some of the foregoing examples, extension 112 is removably attachable to upper step 104 and/or post 102. Alternatively, extension 112 may be affixed to upper step 104 and/or post 102 such that extension 112 may be moved aside to permit apparatus 100 to be used as a climbing stick. In FIG. 2, for example, a hinge may be attached along edges 230 and 232 to permit extension 112 to flip over when not in use such that an upper surface 234 of upper step 104 is in contact with an upper surface 236 of extension 112.

Figure 17:
FIG. 17 is an image of a mobile apparatus strapped to a tree.

FIG. 17 is an image of an example mobile apparatus 1700 that is convertible between a climbing stick and a platform, without use of a tool. In the image of FIG. 17, mobile apparatus 1700 is configured as a platform and is strapped to a tree.

Figure 18:
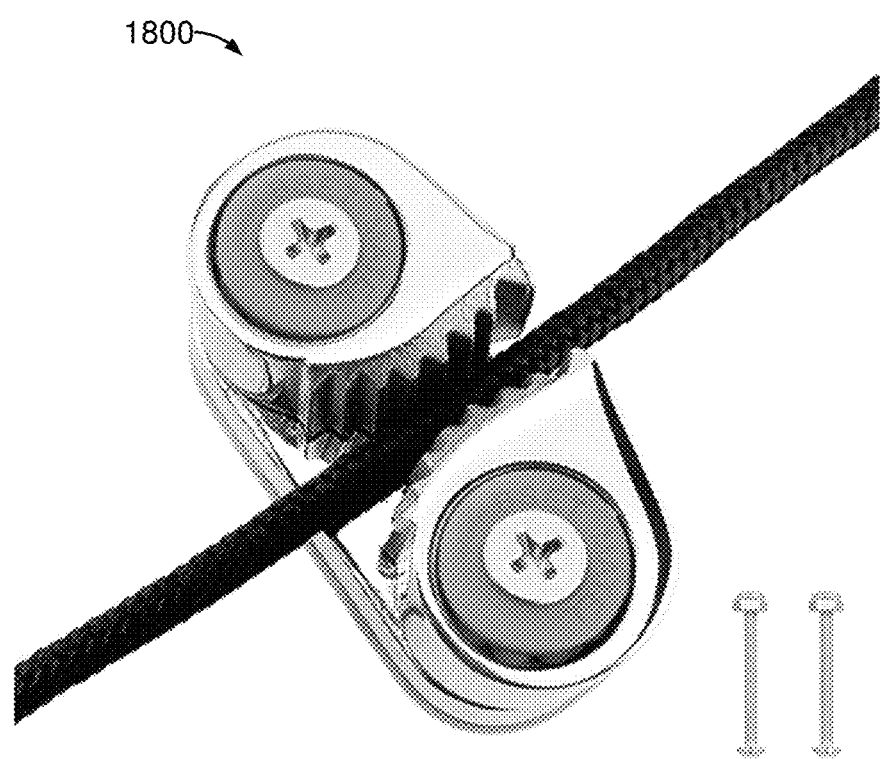
FIG. 18 is an image of an example rope and fast entry cam cleat to strap a mobile apparatus to a tree.
Figure 19:
FIG. 19 is an image of an example strap and associated hardware to strap a mobile apparatus to a tree.

A mobile apparatus as disclosed herein may further include a strap (e.g., rope) and associated hardware to secure the mobile apparatus to a tree. A mobile apparatus may include, for example and without limitation, rope and a fast entry cam cleat. FIG. 18 is an image of an example fast entry cam cleat 1800. FIG. 19 is an image of an example strap and associated hardware to strap a mobile apparatus to a tree. Methods and systems to attach a mobile apparatus to a tree are not, however, limited to the examples of FIG. 17, FIG. 18, or FIG. 19.

Figure 20:
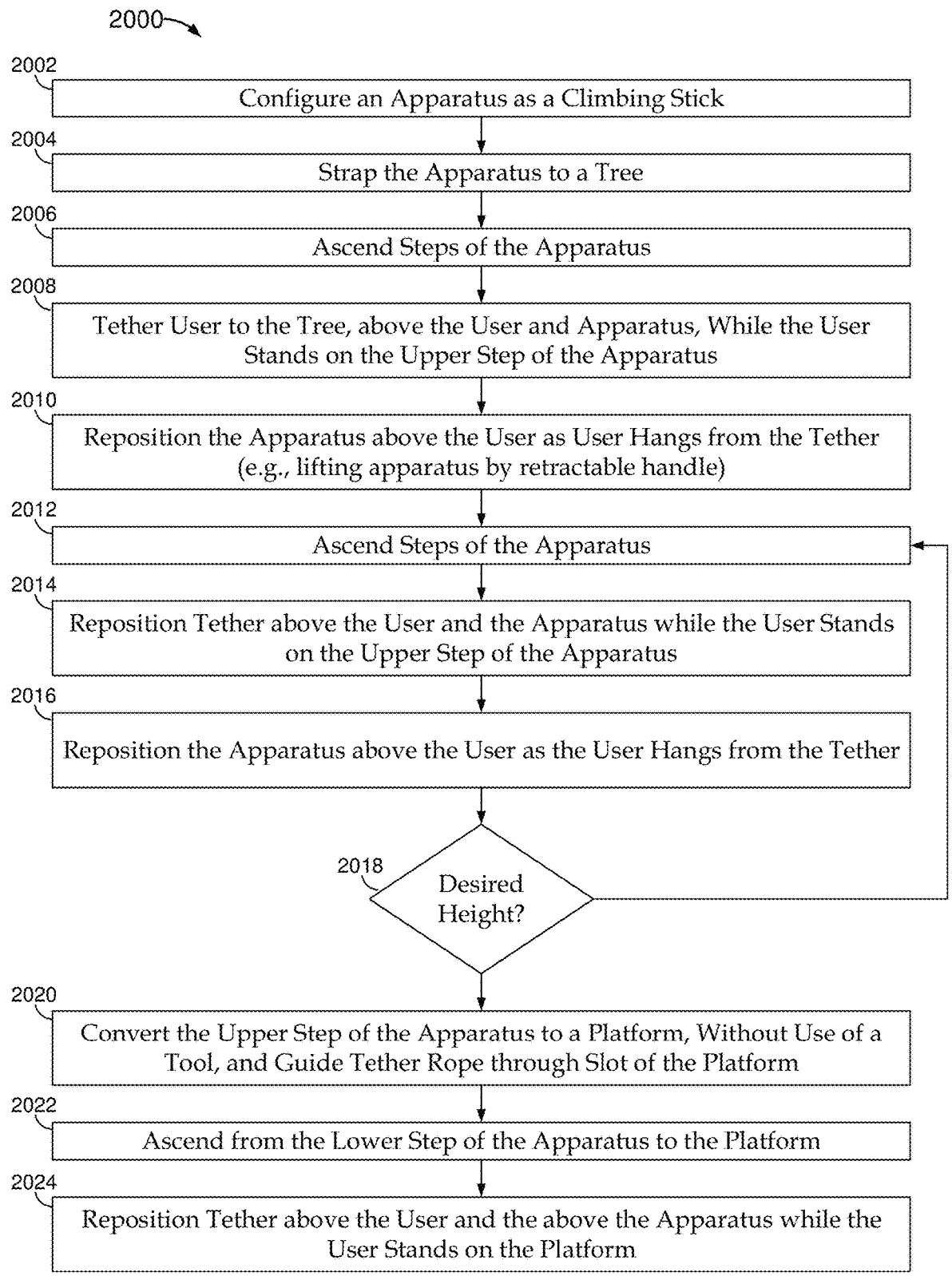
FIG. 20 is a flowchart of a method of using a mobile apparatus that is configurable as a climbing stick and a platform without use of a tool.

FIG. 20 is a flowchart of a method 2000 of using a mobile apparatus that is configurable as a climbing stick and a platform without use of a tool.

At 2002, the mobile apparatus is configured as a climbing stick, such as illustrated in FIG. 3.

At 2004, the mobile apparatus is strapped to a tree.

At 2006, a climber ascends steps of the mobile apparatus. In FIG. 3, the climber may ascend to lower step 108 and then to upper step 104. In an embodiment, a ladder (e.g., a rope ladder) or other climbing device(s) may hang from lower step 108. In this example, the climber may ascend the ladder to reach lower step 108, and then ascend to upper step 104.

As illustrated in the example of FIG. 3, an outer surface 220 of upper step 104 and an outer surface 222 of lower step 108 are substantially within a same plane. When mobile apparatus is configured as a climbing stick (i.e., when extension 112 is in an uninstalled position), no component of mobile apparatus 100 extends beyond outer surfaces 220 and 222. This may be useful to allow a climber to maintain a center of gravity relatively close to a tree while ascending.

At 2008, a tether is secured to/around the tree, above the climber and above the mobile apparatus, while the climber stands on the upper step of the mobile apparatus. The tether is further secured to the climber. The climber may wear a harness (e.g., a saddle harness, a rock-climbing harness, or a utility harness), and the tether may be secured to the harness.

At 2010, the mobile apparatus is repositioned above the climber as the climber hangs from the tether. The climber may, for example, reach down and grasp a retractable handle of the mobile apparatus, and lift the mobile apparatus by the retractable handle. The climber may unstrap the mobile apparatus from the tree or loosen the strap and shimmy the mobile apparatus up the tree. When the mobile apparatus is in position, the climber may re-secure the mobile apparatus to the tree.

At 2012, the climber again ascends steps of the mobile apparatus, such as described above with respect to 2006.

At 2014, the tether is repositioned above the climber and above the mobile apparatus, while the climber stands on the upper step of the mobile apparatus.

At 2016, the mobile apparatus is repositioned above the climber as the climber hangs from the tether, such as described above with respect to 2010.

At 2018, and if the mobile apparatus is not yet at a desired height, 2012, 2014, and 2016 are repeated until the mobile apparatus is at a desired height.

When the mobile apparatus is at the desired height, the mobile apparatus is converted to a platform at 2020, without use of a tool, such as described in one or more examples above.

In FIG. 1, extension 112 has a recessed portion labeled tether guide 140. When extension 112 is placed in the installed position, a tether rope may be guided through tether guide 140.

At 2022, the climber ascends from the lower step of the mobile apparatus to the platform.

At 2024, the tether is repositioned above the climber and above the mobile apparatus while the climber stands on the platform. The climber may remain standing on the platform while tethered to the tree.

In the example of FIG. 20, the climber ascends to the platform after the upper step is converted to the platform. In another embodiment, the mobile apparatus may be converted to a platform while the climber stands on the upper step.

When the climber is ready to descend the tree, the climber may unfasten the mobile device from the tree, hang the mobile device from the climber's harness (e.g., by the retractable handle), and may descend the tree with rappelling equipment. After the climber descends the tree, extension 112 may be removed from the installed position and stored, such as described in one or more examples herein.

As an example, method 2000 may be performed in as little as 4-5 minutes, or less.

Figure 21:
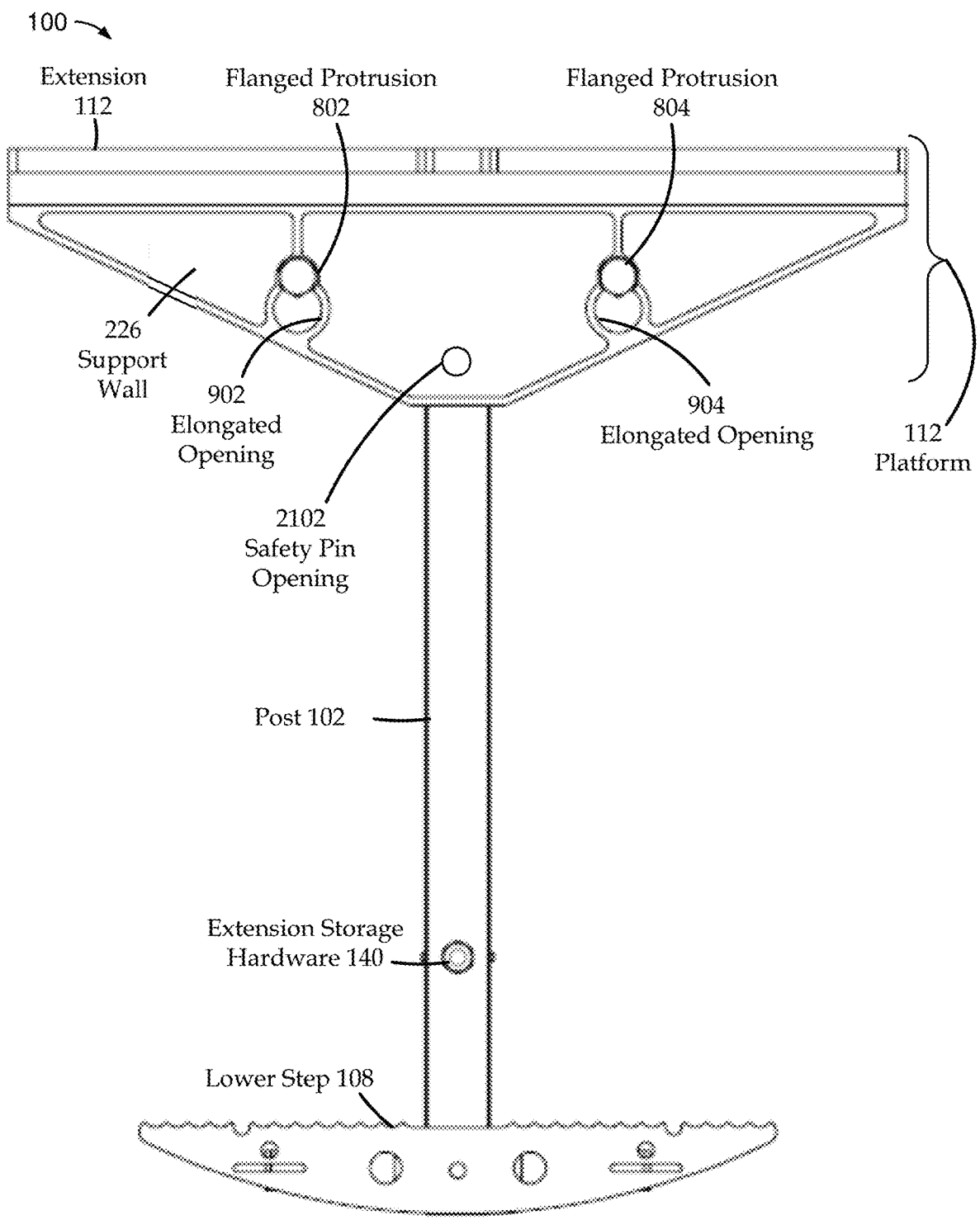
FIG. 21 is an illustration of the mobile apparatus of FIG. 1, in which a safety pin opening is provided in a central portion of a support wall.

In some of the foregoing examples, safety pin openings are provided off-center of post 102. Alternatively, safety pin openings may be provided in a central position of support walls 224 and 226, and post 102, and a safety pin may be configured to extend through all three safety pin openings. FIG. 21 is an illustration of mobile apparatus 100 (View C of FIG. 1), in which a safety pin opening 2102 is provided in a central portion of support wall 226. Corresponding safety pin openings may be provided in post 102 and support wall 224 (FIG. 2).

Figure 22:
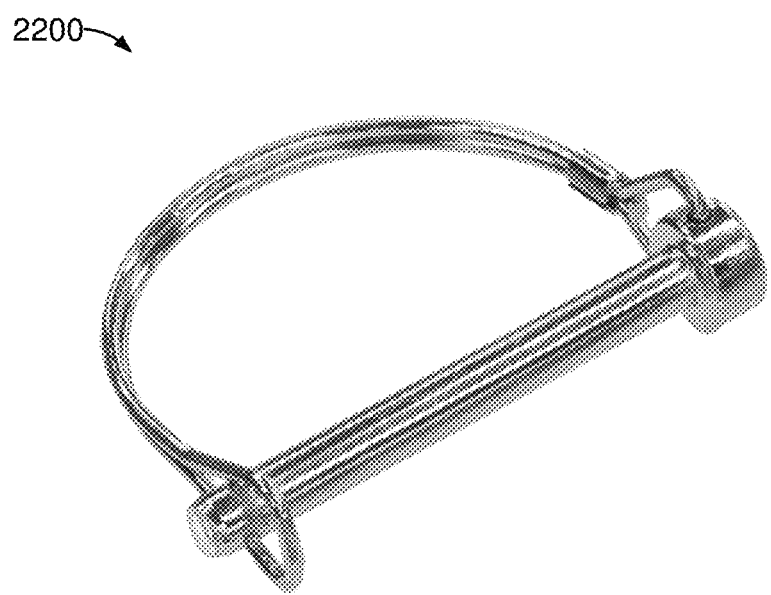
FIG. 22 is an image of an example safety pin.

FIG. 22 is an image of an example safety pin 2200. Other safety pin configurations may be used.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus, comprising:
   a climbing stick that comprises a post, an upper step and an upper tree brace extending from a first end of the post, and a lower step and a lower tree brace extending from a second end of the post; and
   an extension configured to engage only with said climbing stick to convert the upper step to a platform without use of a tool.

2. The apparatus of claim 1, wherein:
   the upper step includes a first support wall extending perpendicularly downward from an edge of the upper step; and
   the extension includes a second wall extending support perpendicularly downward from an edge of the extension;
   wherein the first and second support walls are configured to face one another when the extension is in the installed position.

3. The apparatus of claim 2, further comprising:
   a layer of a sound-suppressing material between the first and second support walls.

4. The apparatus of claim 2, wherein:
   the post extends from a central portion of an edge of the first support wall.

5. The apparatus of claim 2, wherein:
   one of the first and second support walls includes flanged protrusions extending therefrom; and
   the other one of the first and second support walls has elongated openings through which to receive and secure respective ones of the flanged protrusions to maintain the first and second support walls in contact with one another.

6. The apparatus of claim 5, wherein each of the first and second support walls has a safety pin opening therethrough, the apparatus further comprising:
   a removeable safety pin configured to insert through the safety pin openings when the extension is in the installed position to preclude movement of the first and second support walls relative to one another.

7. The apparatus of claim 1, further comprising:
   a first tube along a portion of an edge of the upper step;
   a second tube along a portion of an edge of the extension; and
   a rod that is removably insertable into the first and second tubes to secure the extension to the upper step.

8. The apparatus of claim 1, wherein:
   the extension is removably attachable to the upper step and/or to the first end of the post, without a tool.

9. The apparatus of claim 1, wherein:
   the extension is hingedly connected to the upper step.

10. The apparatus of claim 1, wherein:
    an edge of the upper step is configured as the upper tree brace.

11. The apparatus of claim 1, wherein each of the upper tree brace and lower tree brace comprises:
    a convex V-shaped serrated edge.

12. The apparatus of claim 1, wherein the extension has a recessed portion to serve as a rope guide for a tether rope of a user.

13. The apparatus of claim 1, further comprising:
    a retractable handle configured to retractably extend through an opening of the upper step.

14. The apparatus of claim 1, wherein:
    the extension is further configured to removably attach to the upper step or the post, without a tool, such that the apparatus is wearable as a backpack.

15. The apparatus of claim 1, wherein:
    the first end of the post extends from a central portion of a lower surface of the platform when the extension is in an installed position.

16. The apparatus of claim 1, wherein:
    an upper surface of the extension and an upper surface of the upper step are in a same plane when the extension is in an installed position.

17. The apparatus of claim 1, wherein:
    the extension is further configured to convert the upper step to a platform having a horizontal surface, without a tool.

18. The apparatus of claim 1, wherein:
    a surface area of the platform comprises a sum of a surface area of the extension and a surface area of the upper step.

19. An apparatus, comprising:
    a platform that includes first and second platform portions, wherein an upper surface of the platform comprises respective upper surfaces of the first and second platform portions, and wherein the first platform portion has a first edge configured as a first tree brace; and
    a post extending downwardly from a central portion of a second edge of the first platform portion opposite the first edge;
    wherein the second platform portion is separably attachable to the first platform portion or to the post, without a tool; and
    wherein the apparatus further comprises a second tree brace extending from a lower portion of the post.

20. An apparatus, comprising:
    a climbing stick comprising a post, an upper step, and a lower step, said climbing stick adapted to be placed at elevation adjacent to a tree;
    an extension configured to engage exclusively with said climbing stick to convert the upper step to a platform without use of a tool.

* * * * *